United States Patent [19]

Grant

[11] 4,413,774
[45] Nov. 8, 1983

[54] DIRECT DRIVE AIR REGISTER DAMPER

[76] Inventor: Willie T. Grant, 400 S. Simms St., Lakewood, Colo. 80228

[21] Appl. No.: 354,040

[22] Filed: Mar. 5, 1982

[51] Int. Cl.³ .............................................. F24F 13/10
[52] U.S. Cl. ................................... 236/9 A; 98/102; 126/285 B; 236/49; 251/134
[58] Field of Search ...................... 251/134, 305, 306; 236/1 G, 9 A, 49; 98/102, 106; 126/285 B

[56] References Cited

U.S. PATENT DOCUMENTS

| | | | |
|---|---|---|---|
| 2,241,108 | 5/1941 | Akers | 236/49 |
| 2,269,036 | 1/1942 | Nessell | 236/9 A X |
| 3,724,812 | 4/1973 | Richardson | 251/306 |
| 3,814,312 | 6/1974 | Gerhauser et al. | 236/49 |
| 3,934,796 | 1/1976 | Smith, Jr. et al. | 431/20 X |
| 4,027,655 | 6/1977 | Fell | 236/1 G X |
| 4,079,884 | 3/1978 | Sherman | 236/1 G |
| 4,193,541 | 3/1980 | Scheidweiler | 236/1 G |
| 4,281,638 | 8/1981 | Delaney | 126/285 B X |

Primary Examiner—William E. Tapolocai

[57] ABSTRACT

The present invention is concerned with an improved automatic, direction drive damper device constructed for installation over the terminal openings of furnace duct boots residing within room registers, said device being used as a part of a forced air heating/cooling system for the purpose of controlling and regulating the flow of the heating/cooling medium passing into individual rooms from furnace duct. Direct drive damper means include damper housing with rotatable damper plate, said plate having an integral shaft attached directly and removably to drive shaft of motor means, said damper plate being rotatable between open and closed positions by direct drive motor means when said motor means respond to commands of room thermostat.

9 Claims, 6 Drawing Figures

DIRECT DRIVE AIR REGISTER DAMPER

BACKGROUND

In a previous patent application by Willie T. Grant for a self-operating air register damper, a device is disclosed for automatically controlling the movement of a damper plate pivotally mounted within an associated damper housing, said housing being inserted into the terminal opening of furnace duct boot when said boot terminates in room air register. Specifically, the self-operating damper plate is rotated by the drive belt connecting motor shaft pulley to damper plate pulley, or rotation of said damper plate is accomplished by optional gear drive means.

In practice, the damper housing, constructed to dimensions compatible with standard size duct boots, is not always accepted by said duct boots due to dimensional changes made in the field to aforesaid boots, said dimensional modifications being required to solve ducting installation problems. Additional alterations to make duct boots accept damper housings can be time consuming and costly when said housings encounter altered geometrical shapes of duct boots which are incompatible with standard dimensions and inherent rigidity of said damper housings.

SUMMARY OF THE INVENTION

The present surface mounted direct drive air register damper device overcomes the limitations of the insertable damper housing, said limitations resulting from field resolution of ducting installation problems. The direct drive register damper device being constructed to mount above the open ended duct boot and housed within the new or existing air register has a rotatable damper directly connected to the motor drive shaft, thereby eliminating the necessity for the indirect drive system required by the insertable damper housing device.

The advantages of the surface mounted damper device include inherent ease of installation, avoidance of the installation difficulties encountered with field revised ducting, low installation and purchase costs, and retention of all the requirements for controlling individual room temperatures as set forth in the Grant patent application of a self-operating air register damper.

The subject damper means incorporate a damper housing with a rotatable damper plate mounted on rotating motor shaft at one end and a bearing pin at the other end, said unit being disposed to control air flow through duct from furnace means, thereby regulating temperature of room where said device is installed over duct boot, motor means being electrically connected to and controlled by room thermostat as described in aforesaid patent application; said damper plate being directly connected to the motor shaft is rotated between open and closed positions when said motor responds to signal received from room thermostat.

It is preferred that the damper means be constructed from materials having properties that resist rusting and corrosion and are capable of withstanding the temperatures normally associated with forced air heating and cooling systems. The present invention is constructed to provide a smooth flow path for the heating/cooling medium with minimal obstruction to flow.

One of the objectives of the present invention is to provide an automatic damper means having a rotatable damper connected through a direct drive mechanism to motor means.

Another object is to provide an automatic damper device to control air flow through room air register with damper housing being installed above terminal end of furnace duct boot and supported on surface surrounding said duct boot.

These and other objects and advantages of the present invention will become apparent after considering the following detailed specification and accompanying drawings which cover a preferred embodiment, wherein.

Figure 1:
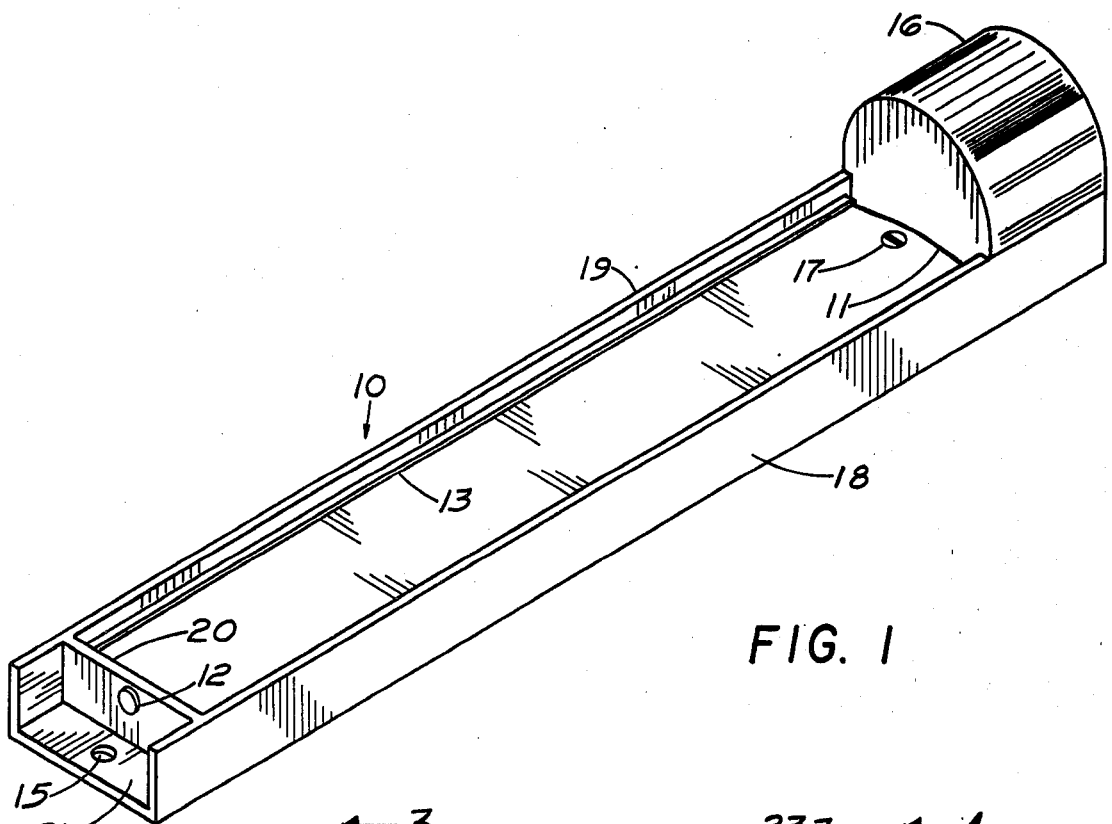
FIG. 1 is a perspective view of a direct drive damper means constructed according to the present invention.

Referring to the views more specifically by reference numbers, FIG. 1 shows an automatic direct drive damper device 10 constructed according to the present invention. The subject device includes a damper housing 9 to be installed over a furnace duct boot 27 or like facility shown in dashed outline and a motor means 23 attached to the motor support 22 of damper housing 9 shown in FIG. 2. Rotatable damper plate 11 supported by bearing pin 12 and motor shaft 25 through end panel 20 and motor support panel 22 respectively of damper housing 9, said damper plate extends approximately the full length of damper housing axis and is attached to said motor shaft by fastener 17.

Figure 3:
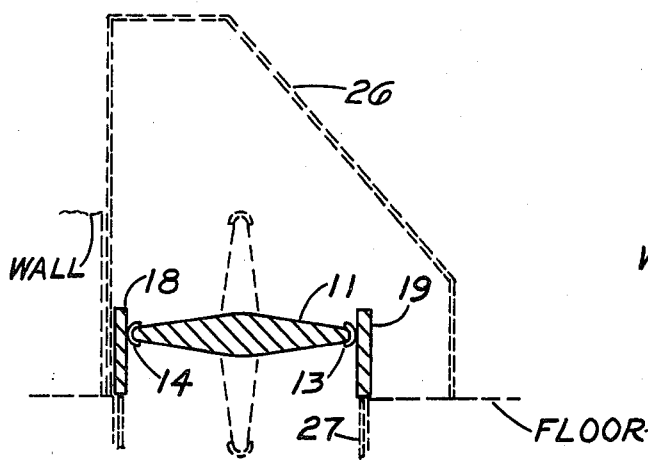
FIG. 3 is a cross-sectional view taken along line 3—3 of FIG. 2.

Damper plate 11 rotates between open and closed positions within the damper housing. When biased to said closed position, the damper plate with attached air sealing means 13 and 14 engage front and rear panels 18 and 19 respectively of damper housing 9 for the purpose of substantially restricting air movement into associated room. Damper plate 11 is shown in closed position by solid line representation and in the open position by the dashed outline in FIG. 3.

Figure 2:
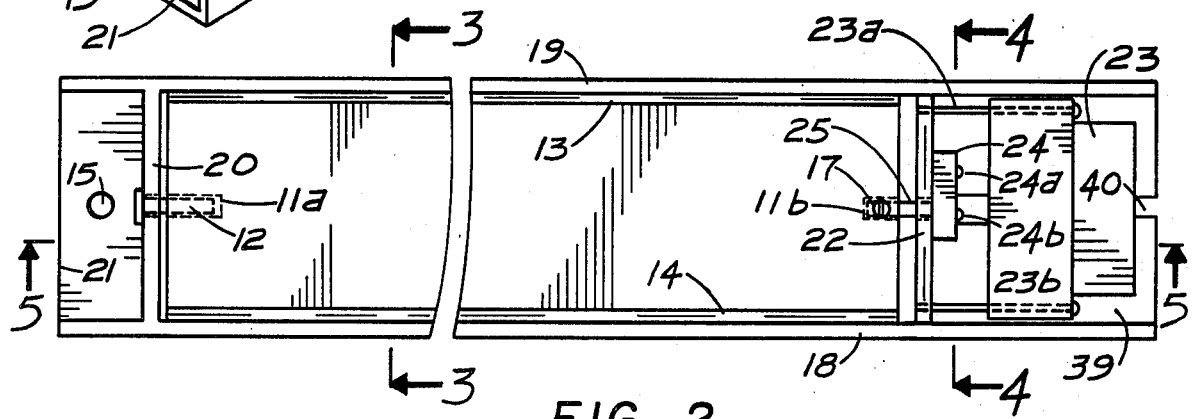
FIG. 2 is a plan view of the register damper device.

Housing 9 of automatic damper device 10 to be secured to external support system by means of proper fasteners utilizing anchor hole 15 and slot 40 is required to be inherently rigid for the purpose of maintaining the original cross-section throughout its service life, subject housing is preferably constructed for rigid, heat resistant and fire retardant plastic material or from heavy guage sheet metal or like material coated with baked enamel to present a pleasing appearance. Aforesaid hole 15 and slot 40, shown in FIG. 2, are incorporated in horizontal plates 21 and 39, said horizontal plates connecting to vertical panels 20 and 22 respectively to form end panels; said end panels fixedly attached to the front and rear panels forming a space within which a damper blade is rotatably mounted. Plates 21 and 39 provide a horizontal extension to the damper housing providing support means for damper device 10, as shown in FIG. 5, permitting the damper housing to be installed over duct boot 27 and to be anchored to an external support system (FIGS. 3–5) by fastening means utilizing hole 15 and slot 40.

Figure 4:
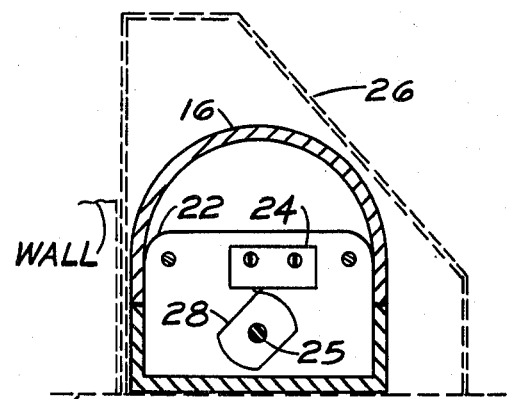
FIG. 4 is a cross-sectional view along line 4—4 of FIG. 2
Figure 5:
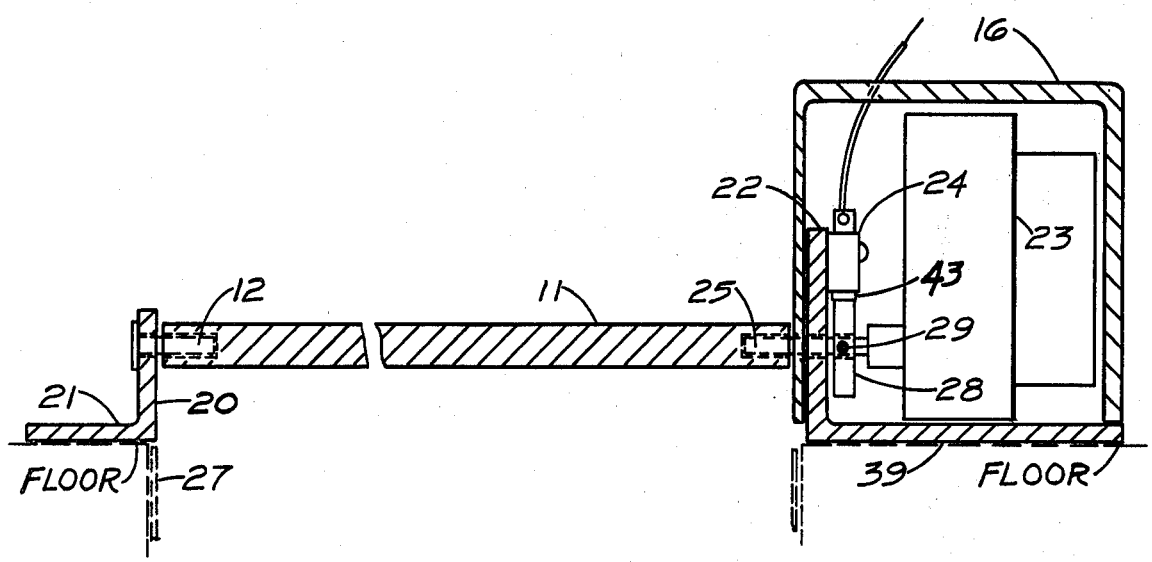
FIG. 5 is a longitudinal cross-section along line 5—5 of FIG. 2.

As shown in FIGS. 4 and 5, motor support panel 22 projects above panels 18 and 19 for the purpose of attaching the motor means and switch means thereto. Panel 22 secures motor 23 through fasteners 23a and 23b while motor switch 24 is attached to said panel by means of fasteners 24a and 24b.

End panel 20 and motor support panel 22 contain holes of proper diameters to receive bearing pin 12 and motor shaft 25, said pins and motor shaft cooperating to engage the ends of rotatable damper plate 11. Containment means comprising intrustions 11a and 11b reside in extremity of said damper plate for the purpose of capturing bearing pin 12 and motor drive shaft 25, said shaft serving to rotate damper plate 11 between open and closed positions.

Damper plate 11, being one integral and continuous section is shortened along the longitudinal axis (FIGS. 2 and 5) for the prescribed purpose of providing clearance for motor cover extending into damper housing and projecting below said damper plate.

When said motor shaft 25 rotates damper plate 11 to the open position, the open damper cooperates with furnace means in the transfer of conditioned air through register 27 into subject room which is required to be heated or cooled. Progressive rotation of the damper plate biases said damper mechanism to the closed position. Damper plate 11 and housing 9 are preferably constructed from materials which can operate maintenance free over long periods of time in an atmosphere common to furnace ducts and like devices.

When said damper plate resides in the closed position, a relatively compressible air sealing material 13 and 14 attached respectively to opposite edges of said damper plate engages front and rear panels 18 and 19 within damper housing 9 and cooperates to restrict air flow through damper means. The compressible sealing means are preferably constructed from a silicon rubber like material normally not affected by the range of temperatures associated with residential heating and cooling equipment, said sealing means are specially shaped to fit around the leading edges of damper plate 11 and be secured to said edges by a compatible bonding agent.

As shown in FIG. 2, motor shaft 25 participated in the releasable connection between damper means and motor means utilizing releasable fastener 17 for anchorage. When energized by the electrical source, the motor means operate the damper means through shaft 25, thereby controlling movement of heated or cooled air into subject room in response to the demands of room thermostat 35 of FIG. 6. Thermostat 35 shown schematically in FIG. 6 operates as a single pole double throw temperature switch under the influence of temperature changes occurring within the room environment. More specifically, when motor 23 becomes energized, motor shaft 25 directly rotates damper 11 to the required position.

As damper 11 completes a quarter of a revolution, cam 28 attached to motor shaft 25 by means of fastener 29 engages switch activator 43 of switch means 24 and forces said switch activator to de-energize motor 23. Damper plate 11 remains biased to the open position until room thermostat 35 has been satisfied, at which time thermostat switch means cause motor 23 to be energized and motor shaft 25 is persuaded to execute an identical procedure to close damper 11. Thermostat 35 influences participation of all other associated mechanisms required to cooperate in closing damper 11, thereby restricting further air flow through the damper means and into subject room. Aforesaid cam 28 having generally circular geometry, incorporates two diametrically opposed quadrants having flatted surfaces and two remaining diametrically opposite quadrants having curved surfaces (FIG. 4). Each curved surface makes contact with and depresses switch activator 43 (FIG. 5) to activate switch means 24 (shown as a single pole double throw switch in FIG. 6) thereby moving said switch means from a first switch position to a second switch position and forcing said switch means to maintain last said position until damper blade has completed a quarter of a revolution and cam releases said switch activator allowing said switch means to return to said first switch position. A flatted surface of cam 28 permits switch activator to remain in a first switch position until a rotation of 90 degrees has been attained by the damper blade causing the cam to again depress switch activator 43 and move the switch means to the second switch position.

As shown in FIG. 1, motor cover 16 encloses the motor means and protects the control mechanism contained therein while adding to the appearance of the device.

Figure 6:
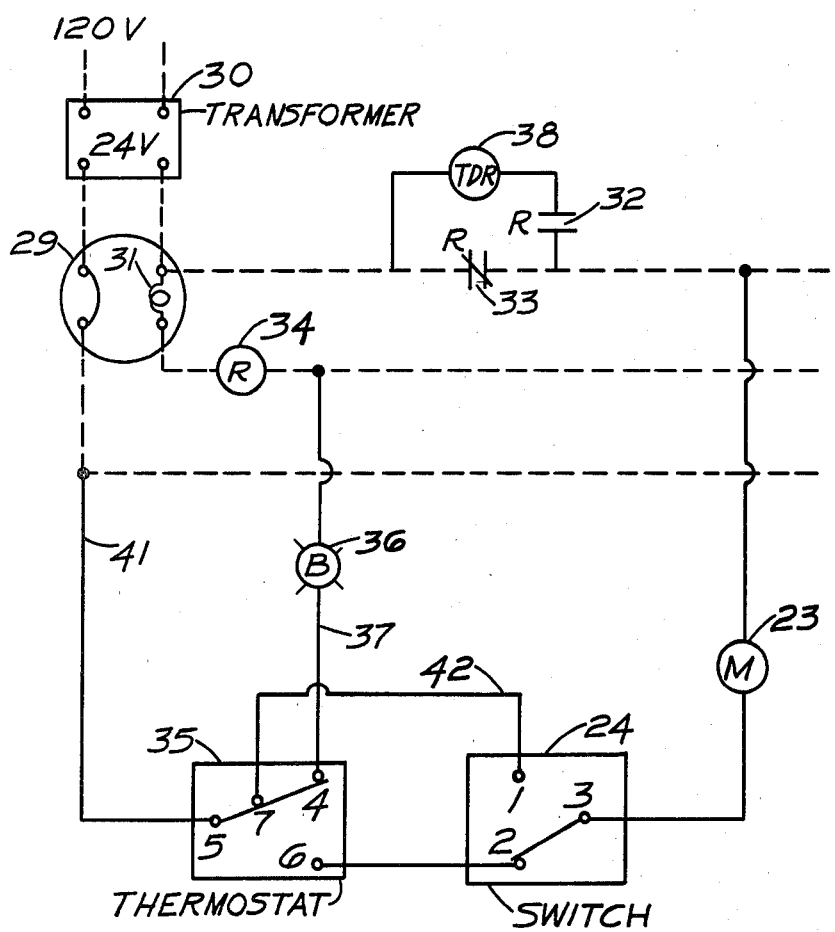
FIG. 6 shows the electrical circuit diagram of the present invention and the interface with an associated furnace device.

The electrical circuit that energizes the preferred embodiment is shown in FIG. 6 with solid lines showing wiring of invention being controlled, and dashed lines showing wiring of the associated device such as a furnace or other air-conditioning means. When temperature of subject room associated with thermostat 35 falls below the present thermostat setting, subject thermostat signals gas valve 29 to open and activate furnace means allowing current to flow through secondary winding of transformer 30, internal wiring of gas valve 29 and through lead 37 connecting thermostat 35 to said gas valve.

FIG. 6 shows the electrical circuit for one of the self-operating air register dampers with thermostat 35 permitting associated room to be heated or cooled. Current flows from the secondary winding of transformer 30 through conductor 41, through thermostatic switch 5-4 and energizes fuel means solenoid 31 utilizing path through conductor 37. As current flows through conductor 37 to energize said solenoid 31, indicator light 36 is also energized and remains in a lighted condition to indicate the present positive influence thermostat 35 has over the furnace means. When subject circuit is de-energized as said thermostat reaches a satisfied condition, indicator light 36 goes off until aforesaid thermostat again calls for a heating or cooling cycle to be initiated.

As current similtaneously flows through secondary circuit consisting of thermostatic switch 5-7, conductor 42, and initially closed contacts 1-3 of motor switch 24, said circuit energizes motor 23 and causes said motor to rotate damper plate 11 to an open position for given purpose of permitting conditioned air to pass through air register into preferred room.

Solenoid 31 remains energized, allowing fuel to be fed to the furnace combustion means until thermostat 35 has been satisfied, whereupon, thermostatic switch 5-4 opens as corresponding switch 5-6 closes. With thermostatic switch 5-6 in a closed position, current flows through contacts 2-3 of switch 24 and through motor 23, said motor rotates damper plate 11 to a closed position as shaft 25 rotates cam 28 such that contacts 1-3 and 2-3 of switch 24 are respectively closed and and opened, thereby disconnecting the electrical circuit of the air register damper. Automatic damper devices in the other rooms undergo identical experiences as the furnace means continue to supply heated or cooled air until the last thermostat is satisfied.

When last thermostat is satisfied internal thermostatic switch 5-4 opens to de-energize magnetic coil 34 and cause normally open contacts 32 to reach a closed position while activating the time delay device 38. (The letter "R" associated with said coil 34, contacts 32 and 33 is indicative of the electrical intraconnections within the composite unit.) With thermostatic switch 5-6 and contacts 2-3 of motor switch 24 closed, the pending current flow is through the circuit connecting thermostat 35, motor 23, and time delay device 38, which is synchronized with furnace blower to permit last damper means to remain in an open position until residual heated air has been blown from furnace box. After passage of the prescribed time interval, time delay relay 38 allows current flow through said circuit, thereby energizing motor 23 and closing damper 11 through previously described operations.

As heretofore explained, the motor means providing for rotation of damper plate 11 incorporate motor shaft 25, said motor shaft transmitting rotation of motor means to damper plate 11.

With the capability to close individual room dampers through separate thermostat settings, use of the subject device permits individual, personal selection of room temperatures and individual maintenance of room comfort, thereby resulting in savings in fuel costs in winter and reduced operating costs of air-conditioning means in summer, including central air-conditioning equipment such as might be a part of the furnace intallation or a separately installed system.

Thus, there has been shown and described an improved automatic damper device which fulfills all the objects and advantages sought after; it being understood, however, that the form of the invention herein described and shown is to be taken as the preferred embodiment. Many changes, modifications variations, other uses, and applications of the present device will become apparent to those skilled in the art after considering this specification and accompanying drawings. All such changes, modifications, variations, other uses, and applications which do not depart from the spirit and scope of the invention are deemed to be covered by the invention which is limited only by the claims which follow:

I claim:

1. Automatic rotatable damper means controlling the flow of a heating/cooling medium through a duct of a heating/cooling device, said damper means comprising in combination:
    (a) closure means having support means, said closure means comprising a rectangular damper housing having a front and a rear longitudinal panel and end panels orthogonally attaching to said longitudinal panels, said end panels having vertical and horizontal plates comprising a first and a second support means;
    (b) rotatable means having compressible means, said rotatable means comprising a damper blade having containment means formed along a longitudinal axis; and compressible means attaching to said damper blade; said containment means engaging a shaft attaching to motor means; said rotatable means being pivotally mounted within said closure means;
    (c) motor means, said motor means comprising an electrically operable motor and a covering for said motor, said covering being supported by said closure means; said shaft of said motor means engaging said containment means of said rotatable means and revolving said rotatable means within a space formed within said panels of said closure means;
    (d) circuit control means, said circuit control means energizing and controlling said motor means having said shaft engaging said containment means formed along said damper blade; said circuit means connecting said motor means to a control element of said heating/cooling device; said circuit control means comprising in combination: a temperature switch having light means and a first and a second switch position, a switch means having double throw means operable by a rotating cam, said cam attaching to said rotatable shaft of said motor means, relay means having a relay coil, first and second contacts, and a time delay relay; said time delay relay connecting to and jointly operating with said second contacts of said relay coil controlling motor rotation and damper blade position, said circuit control means providing electrical and operative connections between said motor means and said control element of said heating/cooling device thereby operating said rotatable means.

2. The means defined in claim 1 wherein said closure means comprising said longitudinal panels and said end panels structurally interlocking and forming boundaries for said space contained therein, said end panels being comprised of vertical plates having fixity with horizontal plates; said vertical plates in combination with said horizontal plates providing said first support means for said damper housing and said second support means for said motor means and said damper blade in combination.

3. The means defined in claim 1 wherein said rotatable means comprises said damper blade having containment means, said containment means engaging a bearing pin, and said shaft of said motor means; said damper blade having compressible means attaching to exterior faces of said damper blade, said damper blade and compressible means in combination being rotated within said space of said closure means by said motor means having a releasable connection to said damper blade through said containment means; said rotation providing an open or closed position in said closure means thereby controlling the flow of said heating/cooling medium through said duct and said closure means.

4. The means defined in claim 1 wherein said motor means comprises said motor having said rotatable shaft engaging said containment means of said damper blade, said motor and shaft jointly rotating said damper blade between open and closed positions within said damper housing, said motor having an electrical interlock with said temperature switch and said control element of said heating/cooling device through said relay means, said interlock through said relay means being controlled by said rotating cam having engagement with said shaft thereby opening and closing said switch of double throw means, said switch of double throw means attaching to said closure means.

5. The means defined in claim 1 wherein said circuit control means having said temperature switch having light means and said first and second switch position interlocking said motor means to said control element of said heating/cooling device through said light means, said relay coil, and said first contacts when said temperature switch occupies said first position; said temperature switch in said second switch position electrically interlocking said motor means to said control element of said heating/cooling device through said switch of double throw means, said second contacts and said time delay relay.

6. Automatic rotatable damper means controlling the temperature within individual environments in a multiple room dwelling having a central heating/cooling system including a heating/cooling device and ducts, said damper means comprising in combination:

(a) closure means, said closure means comprising a damper housing having longitudinal front and rear panels separated by and connecting to end panels, said end panels being comprised of angular plates normal to said front and rear panels and having fixity with said longitudinal panels, said angular plates supporting a damper blade rotatably mounted within a space internal to said connecting panels; said end panels providing support for said damper housing on means external to said damper housing;

(b) rotatable means having compressible means, said rotatable means comprising a damper blade having containment means longitudinal to said damper blade and compressible sealing means attaching to longitudinal edges of said damper blade; said damper blade and compressible means in combination pivotally supported in said space of said closure means providing open and closed conditions within said closure means thereby controlling temperature in said environment, (c) motor means, said motor means having an electrical motor being energized by circuit control means and providing rotary motion to a shaft attaching to said motor means, said shaft rotatably engaging said damper blade through said containment means formed along a longitudinal axis of said damper blade; said shaft having rotatable engagement with a cam; said cam operating a switch having double throw means, said switch incrementing degrees of rotation of said damper blade;

(d) circuit control means, circuit control means having components electrically interconnected including a temperature switch having light means and a first and a second switch position, relay means including a relay coil having first and second contacts, and a time delay relay, said relay means statically positioning said motor means and said rotatable means within said closure means in accordance with a preset condition externally established for said heating/cooling device; said circuit control means electrically connecting said temperature switch to said components of said circuit control means jointly operating said motor means and rotating said damper blade and creating an open or closed position in said damper housing controlling the flow of a heating/cooling medium and said environmental temperature thereby.

7. The means defined in claim 6 wherein said motor means comprise said motor having said shaft engaging said cam operating said switch having double throw means, said shaft engaging said containment means of said damper blade and rotatably supporting said damper blade.

8. The means defined in claim 6 wherein said temperature switch electrically joining said control element of said heating/cooling device to said motor means; said temperature switch activating said control element and said light means concurrently with said relay means and simultaneously operating said motor means having said shaft bilaterally engaging said cam and said damper blade having said containment means; said damper blade engaging said shaft by means of a releasable connection with said containment means, said shaft rotating said damper blade between open and closed positions within said closure means, said cam having engagement with said motor shaft and rotating with said shaft operating said switch means having double throw means.

9. The means defined in claims 1 or 6 wherein said rotatable means having said damper blade formed about a longitudinal axis, said damper blade having said compressible means attaching to said longitudinal edges and exterior faces of said damper blade, said faces being integral with said edges; said damper blade having said containment means formed along a longitudinal axis receiving a bearing pin and said shaft of said motor means, said pin and said shaft engaging said containment means; said shaft and pin rotatably supporting said damper blade in combination with said end panels of said closure means; open and closed positions of said damper blade being electrically and rotatably controlled by said temperature switch having light means and said switch having double throw means in combination with said motor means; said switch having double throw means being activated by said cam having engagement with said shaft of said motor means.

* * * * *